Dec. 30, 1941. S. C. EWING 2,268,207
CONTROL SYSTEM FOR SYNCHRONOUS MACHINES
Filed Dec. 31, 1940

Inventor:
Samuel C. Ewing,
by Harry E. Dunham
His Attorney.

Patented Dec. 30, 1941

2,268,207

UNITED STATES PATENT OFFICE 2,268,207

CONTROL SYSTEM FOR SYNCHRONOUS MACHINES

Samuel C. Ewing, Scotia, N. Y., assignor to General Electric Company, a corporation of New York Application December 31, 1940, Serial No. 372,479

7 Claims. (Cl. 172—289)

My invention relates to control systems for synchronous machines and particularly to a system in which a synchronous machine is synchronized by completing a low resistance circuit across the terminals of the field winding of the machine through suitable unidirectional current conducting means at a time when the induced field current is flowing in such a direction as not to flow through the unidirectional current conducting means and a source of direct current excitation is connected to the field winding after the induced field current starts to flow through the unidirectional current conducting means.

One object of my invention is to provide an improved arrangement of apparatus for effecting the connection of the source of direct current excitation to the field winding in such a synchronizing arrangement.

Figure 1:
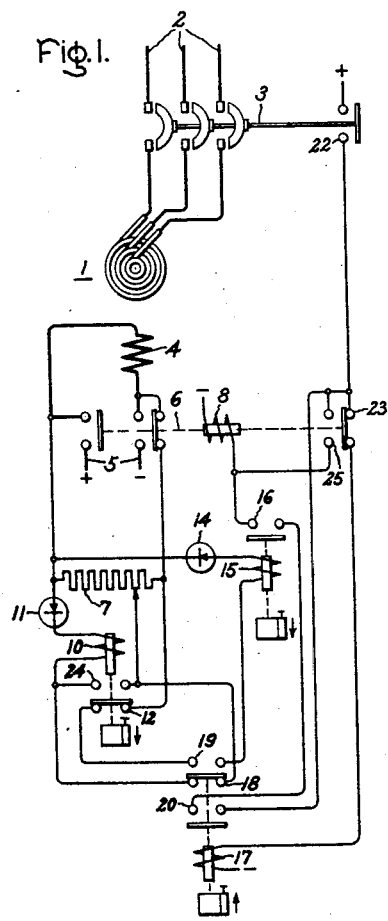
Figure 2:
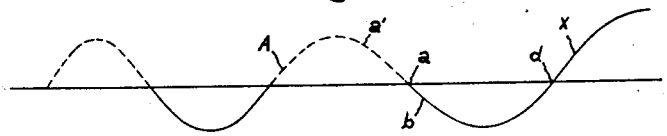

My invention will be better understood from the following description when taken in connection with the accompanying drawing, Fig. 1 of which diagrammatically illustrates a synchronous motor starting system embodying my invention; Fig. 2 of which shows an explanatory curve; and Fig. 3 of which diagrammatically illustrates a modification of the arrangement shown in Fig. 1, and the scope of my invention will be pointed out in the appended claims.

Referring to Fig. 1 of the accompanying drawing, I represents a synchronous motor having an armature winding which is arranged to be connected to a suitable alternating current supply circuit 2 by means of a switch 3 which may be of any suitable type examples of which are well known in the art. While I have shown a manually controlled switch 3, it will be obvious to anyone skilled in the art that any suitable automatic means may be provided for controlling the opening and closing of the switch 3. The motor 1 is also provided with a field winding 4 which is arranged to be connected to a suitable source of excitation 5 by means of a field switch 6. This field switch 6, when open, is arranged to connect suitable impedance means, such as a discharge resistor 7, across the terminals of the field winding 4. The switch 6 is provided with an operating winding 8 which, when energized, moves the switch from its open position in which it is shown in the drawing, to its other position in which the source of excitation 5 is connected to the field winding 4.

For controlling the energization of the operating winding 8 of the switch 6, I provide a time relay 10 and a suitable unidirectional current conducting device, such as a half-wave rectifier 11, in series across a portion of the discharge resistor 7. With such an arrangement, the induced current, which flows through the motor field winding 4 while the motor is operating subsynchronously, causes the relay 10 to pick up and remain in its picked up condition until the motor reaches a predetermined subsynchronous speed at which time the frequency of the induced field current is so low that the half cycle during which no current flows through the winding of the relay 10 is long enough to allow the relay to close its contacts 12. The closing of the contacts 12 completes a half-wave rectifier 14 a low impedance circuit around discharge resistor 7. This half-wave rectifier 14 is connected in such a manner that the half wave of induced field current, which flows through the rectifier 14, is the opposite wave from the one which flows through the half-wave rectifier 11. Therefore, at the time the low impedance circuit through the rectifier 14 is completed, the induced field current is not in a direction to flow through the rectifier 14 and the winding of the relay 10. However, as soon as the induced field current starts to build up in the opposite direction, it flows through the rectifier 14.

In order to effect the closing of the field switch 6, I provide in accordance with my invention a relay 15 the winding of which is connected in series with the half-wave rectifier 14 so that the relay operates to close its contacts 16 as soon as the current in the shunt circuit around the discharge resistor 7 builds up to a predetermined value. The closing of the contact 16 completes an energizing circuit for the closing coil 8 to operate the field switch 6 so that the field winding 4 is connected to the source of excitation 5.

In order to insure that the field switch 6 is not closed until after the motor 1 has started and the relay 10 has had time to open its contacts 12, I provide a relay 17, which has its normally closed contacts 18 connected in series with the winding of the relay 10, its normally open contacts 19 connected in series with contacts 12 of the relay 10 and the operating winding of the relay 15, and its normally open contacts 20 connected in series with the closing coil 8 of the field switch 6 and the contacts 16 of the relay 15. The circuit of the operating winding of the relay 17 includes the auxiliary contacts 22 of the switch 3 and the contacts 23 of the field switch 6 so that the relay 17 is energized whenever the switch 3 is closed and the field switch 6 is open simultaneously. The relay 17 is designed in any suitable manner so that it does not open its contacts 18 and close its contacts 19 and 20 until after the switch 3 has been closed for a predetermined time.

The operation of the arrangement shown in Fig. 1 is as follows:

When it is desired to start the motor 1, the switch 3 is closed so that the full voltage of the supply circuit 2 is applied to the armature winding of the motor to cause it to start from rest and accelerate as an induction motor to approximately synchronous speed. As soon as the motor armature winding is energized, a voltage of slip frequency is induced in the motor field winding 4, and this voltage causes a current of slip frequency to flow through the field winding 4 and the discharge resistor 7 and a pulsating current to flow through the circuit including the half-wave rectifier 11, the winding of relay 10, and the contacts 18 of relay 17 in series. The voltage drop produced across the discharge resistor 7 by this induced field current is sufficient to cause the relay 10 to open its contacts 12 and close its contacts 24 thereby completing a shunt circuit around the contacts 18 of the relay 17. Until the motor 1 reaches substantially synchronous speed, the magnitude and frequency of the pulsating current through the winding of the relay 10 are such that the relay maintains its contacts 12 open.

A short time after the switch 3 closes its auxiliary contacts 22, which thereby completes through contacts 23 of the field switch 6 an energizing circuit for the winding of relay 17, this relay opens its contacts 18 and closes its contacts 19 and 20. The opening of the contacts 18 does not at this time effect the deenergization of the relay 10 since the circuit of this relay is now completed through its own contacts 24.

When the motor speed exceeds a predetermined subsynchronous value, the frequency of the induced field current becomes so low that the time interval of each half cycle during which substantially no current flows through the winding of the time relay 10 is long enough to allow the relay to return to its normally deenergized position and close its contacts 12. A shunt circuit is then completed around the discharge resistor 7 through the contacts 19 of the relay 17, the winding of relay 15 and the half-wave rectifier 14. This shunt circuit is completed during the half cycle of induced field current which does not flow through the rectifier 14. However, as soon as the induced field current reaches zero and starts to build up in the opposite direction, most of the induced current flows through the rectifier 14 and the winding of the relay 15. This low impedance shunt circuit increases the time constant of the field circuit so that any change in the flux linkages existing at the instant the current starts to flow through the rectifier 14 is delayed for a sufficient length of time to allow the motor to pull into step. Also, as soon as the current in this shunt circuit builds up to a predetermined value, the relay 15 closes its contacts 16 and completes through the contacts 20 of the time relay 17 and the contacts 22 of the switch 3 an energizing circuit for the closing coil 8 of the field switch 6. The energization of the closing coil 8 operates the field switch 6 so that the source of excitation 5 is connected to the field winding 4. By closing its auxiliary contacts 25, field switch 6 completes a locking circuit for the closing coil 8 through the auxiliary contacts 22 of the switch 3 so that the closing coil 8 remains energized after relays 15 and 17 become deenergized due to the closing of the field switch 6.

Fig. 2 illustrates more clearly how my improved control arrangement effects the application of the field excitation to the motor field winding. In this Fig. 2 the curve A illustrates the current flowing through the field winding during the synchronizing operation. That portion of the curve to the left of the point $d$ illustrates the induced current of slip frequency that flows through the field winding as the motor approaches the predetermined subsynchronous speed from which it is desired to synchronize the motor. The solid portions of this part of the curve A represents the half waves of induced current during which current flows through the rectifier 11 and the winding of relay 10, and the dotted portions represent the half waves of induced current during which no current flows through the winding of relay 10. In this figure, $a$ represents the point where the relay 10 closes its contacts 12 and completes the circuit through the half-wave rectifier 14 and the relay 15. $d$ represents the point where the current starts to flow through the rectifier 14 and the relay 15, and the solid portion of the curve A to the right of the point $d$ represents a portion of the half cycle of induced field current that flows through the field winding 4 after the current starts to flow through the rectifier 14 and the relay 15, during which time the motor pulls into step, and $x$ represents the value of this current at which the relay 15 operates to complete the circuit of the closing coil 8 to effect the closing of the field switch 6.

Due to the rapid acceleration of the motor when it is started under light load conditions, the relay 10 may drop out at some point during the half cycle when sufficient current is flowing in the proper direction through the field winding 4 to pick up the relay 15. For example, if the relay 10 in Fig. 1 should drop out and complete the circuit through the rectifier 14 and the relay 15 at the point $a'$ in Fig. 2, then relay 15 would pick up and complete the circuit of the closing coil 8 of the field switch 6 so as to apply excitation to the field winding 4 at the wrong time.

Figure 3:
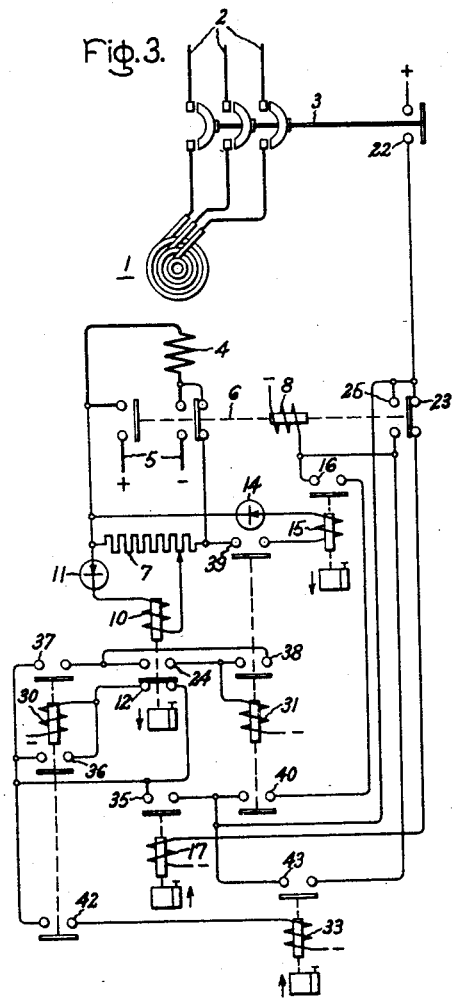

In the modification shown in Fig. 3, I have provided an arrangement for preventing this undesirable operation of the field switch 6. In this modification the dropping out of the relay 10 effects the operation of an auxiliary relay 30 which completes a holding circuit for itself independently of the position of the relay 10. The relay 30 also controls the circuit of another auxiliary relay 31 so that it is energized when both of the relays 10 and 31 are simultaneously energized. The relay 31, when energized, completes the circuit through the rectifier 14 and the relay 15 which is connected in shunt with the discharge resistor 7.

In order to insure that the excitation is applied in case the relay 10 fails to pick up again after the relay 30 is energized, I provide a time relay 33 which is so connected that it is energized in response to the energization of the auxiliary relay 30 and which, after being energized for a predetermined time, completes an energizing circuit for the closing coil 8 of the field switch 6.

The operation of the modification shown in Fig. 3 is as follows:

When the switch 3 is closed, the motor 1 starts and accelerates to a predetermined subsynchronous speed and the relays 10 and 17 pick up in the manner described in connection with the arrangements shown in Fig. 1. As soon as the speed of the motor 1 increases above a predetermined value, the relay 10 closes its contacts 12 during a portion of each half cycle during which no current flows through the winding of the relay 10. The closing of the contacts 12 completes through contacts 22 of the switch 3 and the contacts 35 of the relay 17 an energizing circuit for the auxiliary relay 30. The closing of the contacts 36 of the relay 30 completes a shunt circuit around the contacts 12 of the relay 10 so that the relay 30 remains energized when relay 10 opens its contacts 12 and closes its contacts 24 during the next half cycle of the induced field current. After the relay 30 is energized, the closing of the contacts 24 of the relay 10 completes an energizing circuit for the relay 31 through contacts 37 of relay 30, contacts 35 of the relay 17 and contacts 22 of the switch 3. By closing its contacts 38, the relay 31 completes a shunt circuit around the contacts 24 of the relay 10, and by closing its contacts 39, relay 31 completes a low impedance shunt circuit around the discharge resistor 7 through the rectifier 14 and the winding of relay 15. This low impedance shunt circuit is completed during the half cycle when no current flows through the rectifier 13. During the next half cycle, however, current flows through this low impedance shunt circuit and causes the motor to pull into step. Also the current in this shunt circuit causes the relay 15 of the relay 31 and the contacts 22 of the switch 3 an energizing circuit for the closing coil 8 of the field switch 6 so that the field switch is closed to apply excitation to the field winding 4.

When the relay 30 becomes energized in response to the relay 10 closing its contacts 12, the contacts 42 of the relay 30 complete an energizing circuit for the time relay 33 through contacts 35 of the relay 17 and the contacts 22 of the switch 3. After being energized for a predetermined time, the relay 33 closes its contacts 43 and completes an energizing circuit for the closing coil 8 of the field switch 6 in case the field switch is not closed within a predetermined time interval after the relay 30 is energized. This insures that excitation is applied to the field winding in case the relay 10 for any reason should fail to pick up and close its contacts 24 after the motor has reached a sufficient speed to cause the relay 10 to drop out and close its contacts 12.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a synchronous machine having an armature winding and a field winding, impedance means connected in series with said field winding, means for supplying alternating current to said armature winding, unidirectional current conducting means, means for completing around said impedance means a relatively low impedance shunt circuit including said unidirectional current conducting means during that portion of the cycle of induced field current when that current is in such a direction as not to flow through said unidirectional current conducting means, and control means energized by and responsive to the magnitude of the current flowing through said unidirectional current conducting means.

2. In combination, a synchronous machine having an armature winding and a field winding, impedance means connected in series with said field winding, means for supplying alternating current to said armature winding, unidirectional current conducting means, means for completing around said impedance means a relatively low impedance shunt circuit including said unidirectional current conducting means during that portion of the cycle of induced field current when that current is in such a direction as not to flow through said unidirectional current conducting means, a source of excitation, and means energized by and responsive to the current flowing through said unidirectional current conducting means for connecting said source to said field winding.

3. In combination, a synchronous machine having an armature winding and a field winding, impedance means connected in series with said field winding, means for supplying alternating current to said armature winding, unidirectional current conducting means, a time delay dropout relay connected in series with said unidirectional current conducting means around said impedance means, a second unidirectional current conducting means, means responsive to the operation of said relay for completing around said impedance means a relatively low impedance circuit including said second unidirectional current conducting means, and control means energized by and responsive to the magnitude of the current flowing through said second unidirectional current conducting means.

4. In combination, a synchronous machine having an armature winding and a field winding, impedance means connected in series with said field winding, means for supplying alternating current to said armature winding, unidirectional current conducting means, a time delay dropout relay connected in series with said unidirectional current conducting means around said impedance means, a second unidirectional current conducting means, means responsive to the operation of said relay for completing around said impedance means a relatively low impedance circuit including said second unidirectional current conducting means, a source of excitation, and means energized by and responsive to the magnitude of the current flowing through said second unidirectional current conducting means for connecting said source to said field winding.

5. In combination, a synchronous machine having an armature winding and a field winding, impedance means connected in series with said field winding, means for supplying alternating current to said armature winding, unidirectional current conducting means, a time delay dropout relay connected in series with said unidirectional current conducting means around said impedance means, a second unidirectional current conducting means, means responsive to the dropping out and the subsequent picking up of said relay when the slip of said machine is above a predetermined value for completing around said impedance means a relatively low impedance circuit including said second unidirectional current conducting means, and control means responsive to the magnitude of the current flowing through said second unidirectional current conducting means.

6. In combination, a synchronous machine having an armature winding and a field winding, impedance means connected in series with said field winding, means for supplying alternating current to said armature winding, unidirectional current conducting means, a time delay drop-out relay connected in series with said unidirectional current conducting means around said impedance means, a second unidirectional current conducting means, means responsive to the dropping out and the subsequent picking up of said relay when the slip of said machine is above a predetermined value for completing around said impedance means a relatively low impedance circuit including said second unidirectional current conducting means, a source of excitation, and means responsive to the magnitude of the current flowing through said second unidirectional current conducting means for connecting said source to said field winding.

7. In combination, a synchronous machine having an armature winding and a field winding, impedance means connected in series with said field winding, means for supplying alternating current to said armature winding, unidirectional current conducting means, a time delay drop-out relay connected in series with said unidirectional current conducting means around said impedance means, a second unidirectional current conducting means, means responsive to the dropping out and the subsequent picking up of said relay when the slip of said machine is above a predetermined value for completing around said impedance means a relatively low impedance circuit including said second unidirectional current conducting means, a source of excitation, means responsive to the magnitude of the current flowing through said second unidirectional current conducting means for connecting said source to said field winding, and means responsive to the dropping out of said relay for effecting after a predetermined time the connection of said source to said field winding.

SAMUEL C. EWING.